United States Patent
Kim et al.

(10) Patent No.: US 8,265,197 B2
(45) Date of Patent: Sep. 11, 2012

(54) OFDM TRANSMISSION METHODS IN THREE PHASE MODES

(75) Inventors: Il Han Kim, Dallas, TX (US); Badri N. Varadarajan, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 239 days.

(21) Appl. No.: 12/839,315

(22) Filed: Jul. 19, 2010

(65) Prior Publication Data

US 2011/0026621 A1 Feb. 3, 2011

Related U.S. Application Data

(60) Provisional application No. 61/230,840, filed on Aug. 3, 2009.

(51) Int. Cl.
*H04K 1/02* (2006.01)
*H04L 25/03* (2006.01)
*H04L 25/49* (2006.01)

(52) U.S. Cl. ........ 375/296; 375/285; 375/346; 375/231; 375/232; 375/260; 370/201

(58) Field of Classification Search ................ 375/296, 375/285, 346, 231, 232, 260; 370/201
See application file for complete search history.

(56) References Cited

U.S. PATENT DOCUMENTS

| | | | | |
|---|---|---|---|---|
| 5,952,914 | A * | 9/1999 | Wynn | 370/290 |
| 6,317,031 | B1 * | 11/2001 | Rickard | 307/3 |
| 6,373,377 | B1 | 4/2002 | Sacca et al. | |
| 6,983,027 | B2 | 1/2006 | Seki et al. | |
| 7,027,483 | B2 | 4/2006 | Santhoff et al. | |
| 2002/0118101 | A1 * | 8/2002 | Kline | 340/310.01 |
| 2007/0201572 | A1 | 8/2007 | Krauss et al. | |
| 2009/0052582 | A1 | 2/2009 | Oren | |
| 2009/0060060 | A1 | 3/2009 | Stadelmeier et al. | |
| 2009/0074086 | A1 | 3/2009 | Murakami et al. | |
| 2009/0124209 | A1 * | 5/2009 | Keselman | 455/67.13 |
| 2009/0321079 | A1 * | 12/2009 | Robinson | 166/335 |
| 2010/0054314 | A1 | 3/2010 | Korobkov et al. | |

* cited by examiner

*Primary Examiner* — Phuong Phu
(74) *Attorney, Agent, or Firm* — Steven A. Shaw; W. James Brady; Frederick J. Telecky, Jr.

(57) ABSTRACT

Systems and methods for power line transmission are disclosed in which transmitters and receivers are connected to one or more phases of the power line. At least one symbol stream to be transmitted on the power line network is generated. The at least one symbol stream is scaled using a weight vector to generate a plurality of scaled symbol streams. The weight vector comprises a plurality of weights, each corresponding to a phase of the power line network. Each of the scaled symbol streams are transmitted on a corresponding phase of the power line network. A zero crossing detector identifies phase information for a receiver. A concentrator adapts signals to be sent to the receiver based upon the phase associated with the receiver.

26 Claims, 8 Drawing Sheets

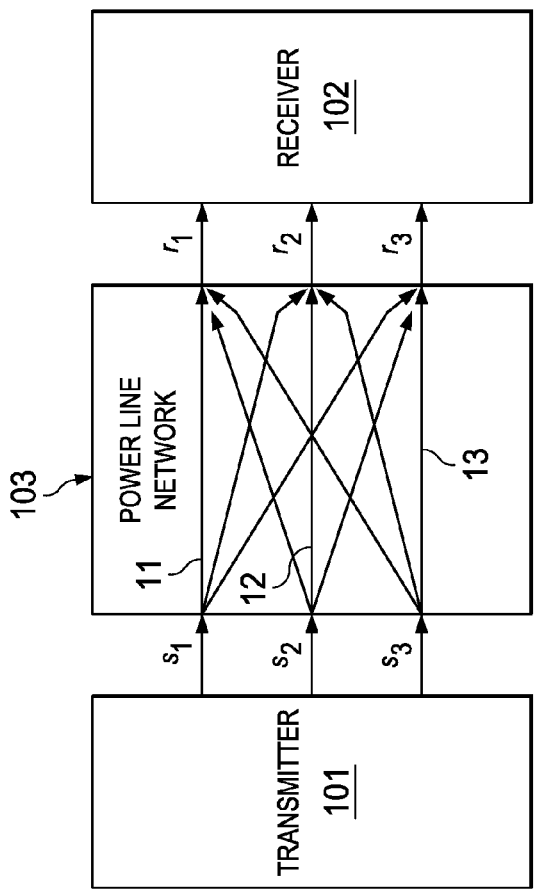
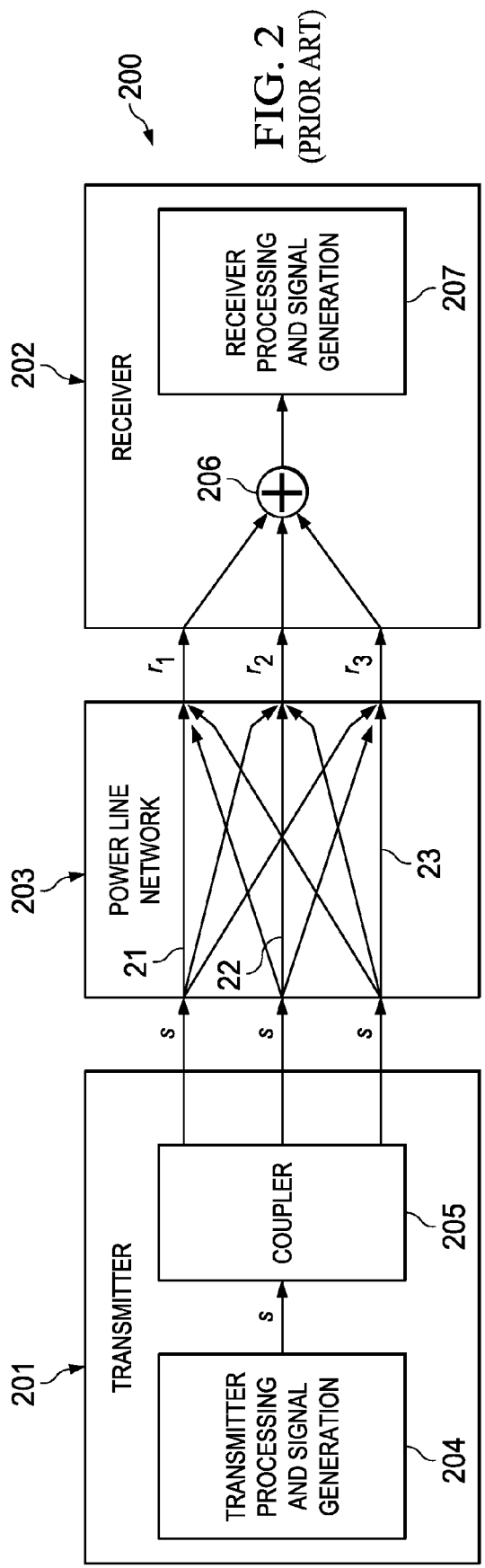
FIG. 1 (PRIOR ART)
FIG. 2 (PRIOR ART)

OFDM TRANSMISSION METHODS IN THREE PHASE MODES

CROSS-REFERENCE TO RELATED APPLICATIONS

The present application claims the benefit of the filing date of U.S. Provisional Application No. 61/230,840, which is titled "OFDM Transmission Methods in Three Phase Modes" and was filed Aug. 3, 2009, the disclosure of which is hereby incorporated by reference herein in its entirety.

TECHNICAL FIELD

Embodiments of the invention are directed, in general, to communication systems and, more specifically, transmission of Orthogonal Frequency-Division Multiplexing (OFDM) communications over power lines.

BACKGROUND

There has been a lot of interest in the use of power lines as communication media to reduce the cost of reliable communications. This is generally referred to as power line communications (PLC). There have been standardization efforts for PLC, such as Powerline-Related Intelligent Metering Evolution (PRIME). In most of the PLC standards, communication must be supported on three phases because three-phase transmission is a power line characteristic in most countries. However, because of coupling between the phases, the signals received on each of phases are not completely independent. For example, a signal in phase two may act as interference to the signal in phase one. There is a need to remove this interference. Furthermore, each of power-line transmission phases may act as an independent path from the transmitter(s) to the receiver(s). These independent paths can be used to enhance the received signal quality.

FIG. 13 illustrates a typical electric power distribution system connecting substation 1301 to residences 1302a-n. Medium voltage (MV) power lines 1303 from substation 1301 carry voltage in the tens of kilovolts range. Transformer 1304 steps the MV power down to low voltage (LV) power on LV lines 1305 carrying voltage in the range of 100-240 VAC. Transformer 1304 is typically designed to operate at very low frequencies in the range of 50-60 Hz. Transformer 1304 does not allow high frequencies, such as signals greater than 100 KHz, to pass between LV lines 1305 and MV lines 1303. LV lines 1305 feed power to customers via meters 1306a-n, which are typically mounted on the outside of residences 1302a-n. A breaker panel, such as panel 1307 provides an interface between meter 1306n and electrical wires 1308 within residence 1302n. Electrical wires 1308 deliver power to outlets 1310, switches 1311 and other electric devices within residence 1302n.

The power line topology illustrated in FIG. 13 can be used to deliver high-speed communications to residences 1302a-n. Power line communications modems 1312a-n may be coupled to LV power lines 1305 at meter 1306a-n. PLC modems 1312a-n are used to transmit and receive data signals over MV/LV lines 1303, 1305. Such data signals may be used to support communication systems, high speed Internet, telephony, video conferencing, video delivery and similar services. By transporting telecommunications and data signals over a power transmission network, there is no need to install new cabling to each subscriber 1302a-n. Thus, by using existing electricity distribution systems to carry data signals, significant cost savings are possible. One method for transmitting data over power lines uses a carrier signal having a frequency different from that of the power signal. The carrier signal is modulated by the data to be transmitted. Alternatively, PLC modem 1313 may be coupled to the MV/LV power lines via home electrical lines 1308 to transmit and receive the data signals.

PLC modems 1312a-n at residences 1302a-n use the MV/LV power grid to carry data signals to and from concentrator 1314 without requiring additional wiring. Concentrator 1314 may be coupled to either MV line 1303 or LV line 1305. Modems 1312a-n may support applications such as high-speed broadband internet links, narrowband control applications, and low bandwidth data collection applications. In a home environment, modems 1312a-n may enable home and building automation in heat and air conditioning, lighting and security. Outside the home, power line communication networks provide street lighting control and remote power meter data collection.

A problem with using a power line network as a communications medium is that the power lines are subject to noise and interference. Power line cables are susceptible, for example, to noise from broadcast radio signals and from electrical equipment coupled to the power lines. Noise propagates along the power lines and combines with communications signals, which may corrupt the communications signals. Another problem with using power line networks is caused by the structure of the cable. On MV and LV power lines, the inner section of the cable comprises a group of phase lines, each carrying one of the three supply phases. At radio frequencies, the capacitance between these separate lines causes the signals on one line to leak or couple onto the neighboring lines. The coupling process between phase lines may introduce a phase shift or other interference. Therefore, after propagating along the lines, the components of a communications signal on each line will no longer be in phase with each other, but will be of different phase and amplitude. Such coupling and interference cause problems with receiving equipment, which must attempt to decode the modified received signal and reconstruct the original signal.

U.S. Pat. No. 6,373,377 B1 to Sacca, et al. relates to a power supply with digital data coupling for power-line networking. The power supply of this document is located within a computer system and is coupled to a network interface card by a digital coupler. A circuitry block converts digital signals from the digital coupler to analog signals. An analog front end amplifies the analog signals for transmission to a power line. The power supply of U.S. Pat. No. 6,373,377 B1 does not scale or weight data signals before distributing the data signals to different phases of the power line.

U.S. Pat. No. 6,983,027 B2 to Seki, et al. relates to a receiver adapted to receive an OFDM signal. Signals are received at an antenna and converted to an intermediate frequency band signal, which is then converted into a digital signal. Information is detected within the digital signal. A signal-to-noise (SNR) ratio is generated from the output of a differential detection circuit. The SNR indicates a reception quality of the OFDM signal. The receiver of U.S. Pat. No. 6,983,027 B2 does not scale or weight data signals before distributing the data signals to different phases of the power line.

U.S. Pat. No. 7,027,483 B2 to Santhoff, et al. relates to a system for ultra-wideband communications through power lines. This document compares transmitting data across power lines using ultra-wideband signals to transmission using orthogonal frequency division multiplexing (OFDM). It is noted that allowing an OFDM system to adapt to channel characteristics is prohibitively complex and expensive.

Instead, the document proposes using ultra-wideband signals with transmission power, pulse envelope shape and pulse recurrence frequency that are optimized for power-line transmission. The ultra-wideband system of U.S. Pat. No. 7,027,483 B2 does not scale or weight data signals before distributing the data signals to different phases of the power line.

U.S. Patent Publication No. 2009/0060060 A1 to Stadelmeier, et al. relates to transmitting an OFDM-modulated signal from a transmitter to a receiver over a power line network. A single signal is modulated for transmission in a multiple input multiple output (MIMO) mode. The system is capable of transmitting the signal only on two channels or two wires of a home electrical system. A single receiver receives the MIMO transmission over four channels comprising three wires and a common mode path. The transmission system of U.S. Patent Publication No. 2009/0060060 A1 does not scale or weight one or more data signals simultaneously before distributing the data signals to different phases of the power line. This document does not disclose identifying the phase used by the PLC modem.

U.S. Patent Publication No. 2010/0054314 A1 to Korobkov, et al. relates to initializing a modem for OFDM transmission. A length or duration of a guard interval or cyclic prefix in an OFDM symbol is newly selected at each modem start up. The modem receives a pre-defined linear frequency modulated (LFM) sweep-signal or a pseudo noise signal that covers all the frequencies on the channel. The transfer function for the channel is estimated from the received signal. An input filter is synthesized based on the estimated transfer function. A number of samples of the guard interval are selected based on an impulse response on the communication channel. The modem initialization procedure of U.S. Patent Publication No. 2010/0054314 A1 does not scale or weight one or more data signals simultaneously before distributing the data signals to different phases of the power line.

SUMMARY OF THE INVENTION

Embodiments of the invention provide a system and method for power line communications, such as over a three-phase power line network. A single data stream may be coupled to each phase of the power line network, or a plurality of signals may be coupled to each phase. Each phase is carried on a separate physical power line, which acts as the transmission medium. Signals carried on the different power lines may experience mutual interference and/or coupling, which causes distortion of the signals. Embodiments of the invention determine how the power lines interfere with and/or couple to each other and create a matrix that models the transmission medium. The matrix can be used to precode the signals before they are transmitted so that the effects of the transmission medium on the signals are neutralized when the signals are received at a receiver.

The receiver may send information regarding the transmission medium to the transmitter so that the transmitter may determine how to precode the transmission signals. For example, the transmitter may send a known signal to the receiver, which allows the receiver to identify the transmission medium's effects on the known signal. Alternatively, the transmitter and receiver may use a common codebook to model the transmission medium. The receiver may notify the transmitter as to which codebook entry to use for precoding the signals, such as by sending a codebook index for the appropriate precoding data. In other embodiments, the transmitter may estimate the effects of the transmission channel based upon signals sent by the receiver. Assuming that the effects of the transmission medium are similar in both directions, the transmitter may use such received signals to determine what precoding to use for signals transmitted to the receiver.

The number of independent signals sent across the transmission medium at one time determines the "rank" of the system. A system with a rank of one sends a single signal that is spread across each phase of the transmission line. As described herein, a rank one system uses beamforming to transmit a signal across the power line network. A system with a rank of two or three sends two or three independent signals, respectively, across the transmission medium by spreading each signal to each phase of the transmission line. As described herein, a rank two or higher system uses phase multiplexing to distribute multiple signals to each power line phase.

The transmitter and receiver processing for the beamforming and phase multiplexing cases may be performed in a signal processing unit, such as a microprocessor or dedicated circuit. In one embodiment, the signal processing unit outputs three separate transmission signals, where each signal corresponds to one of the power line phases. The signal processing unit may be coupled to the power lines by an analog circuit comprising digital-to-analog convertors, filters and line drivers. A transformer and coupling capacitor may also be used to couple the analog circuit/line driver to the power line network. There may be one analog circuit for each power line phase, or a single analog circuit that is switchably connected to each power line phase. Received signals may pass independently through the analog circuit/line driver for the respective power line phases to the signaling processing unit. Alternatively, for the beamforming case, the received signals may be combined, such as in a summing filter, into a single received signal that is provided to the signal processing unit.

BRIEF DESCRIPTION OF THE DRAWINGS

Figure 3:
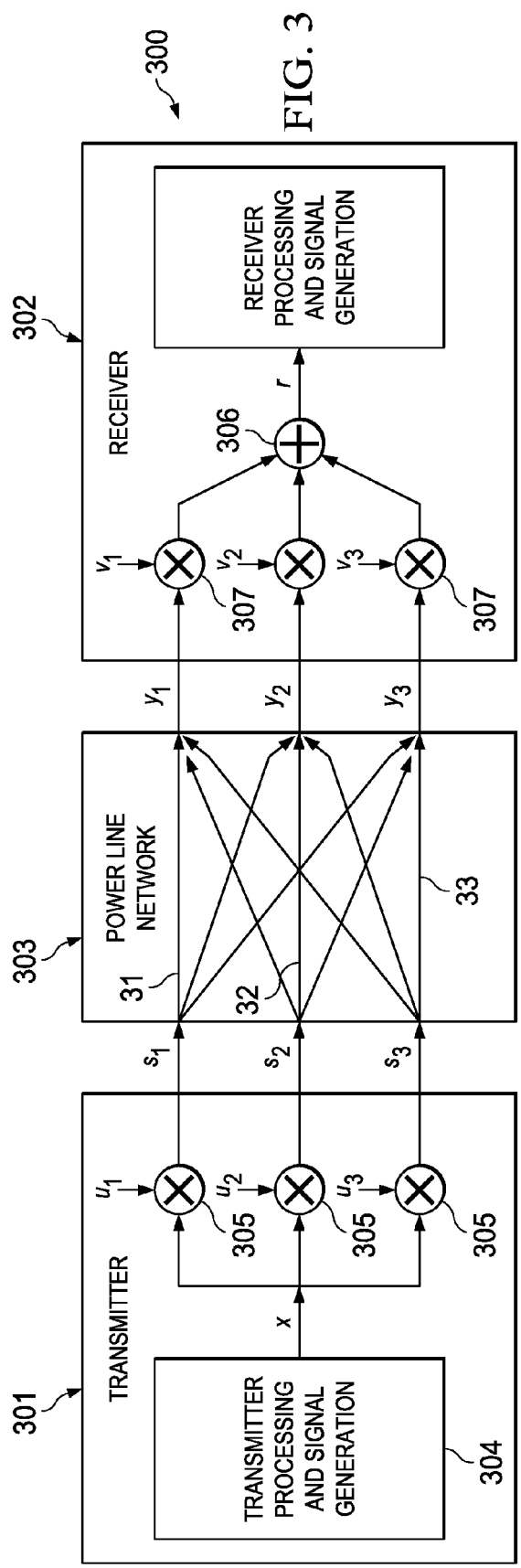
Figure 4:
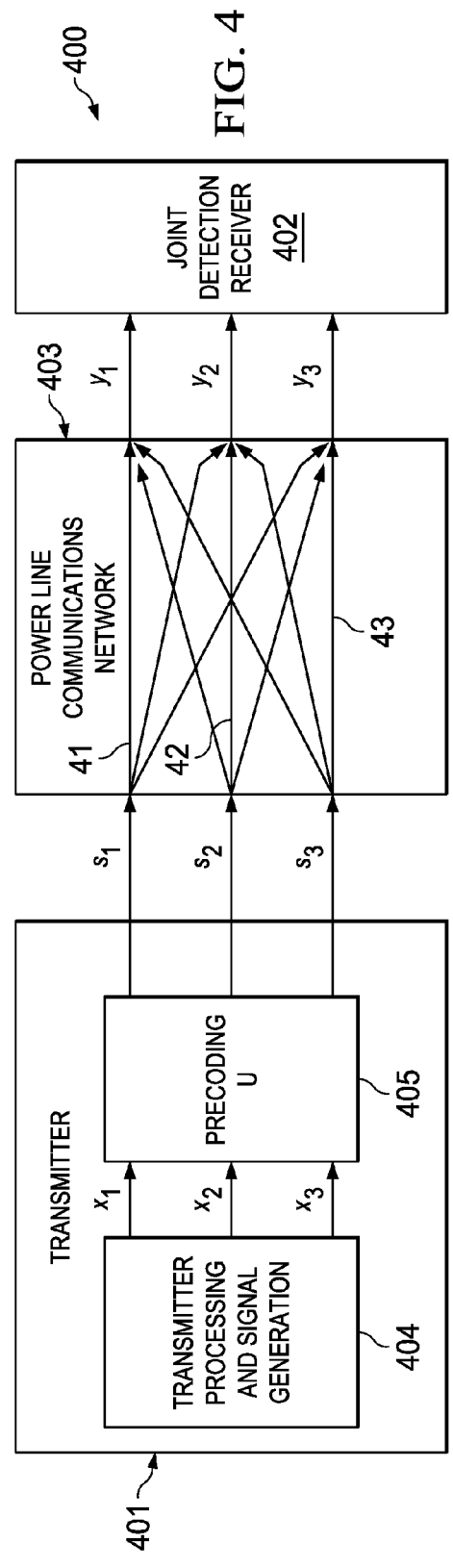
Figure 5:
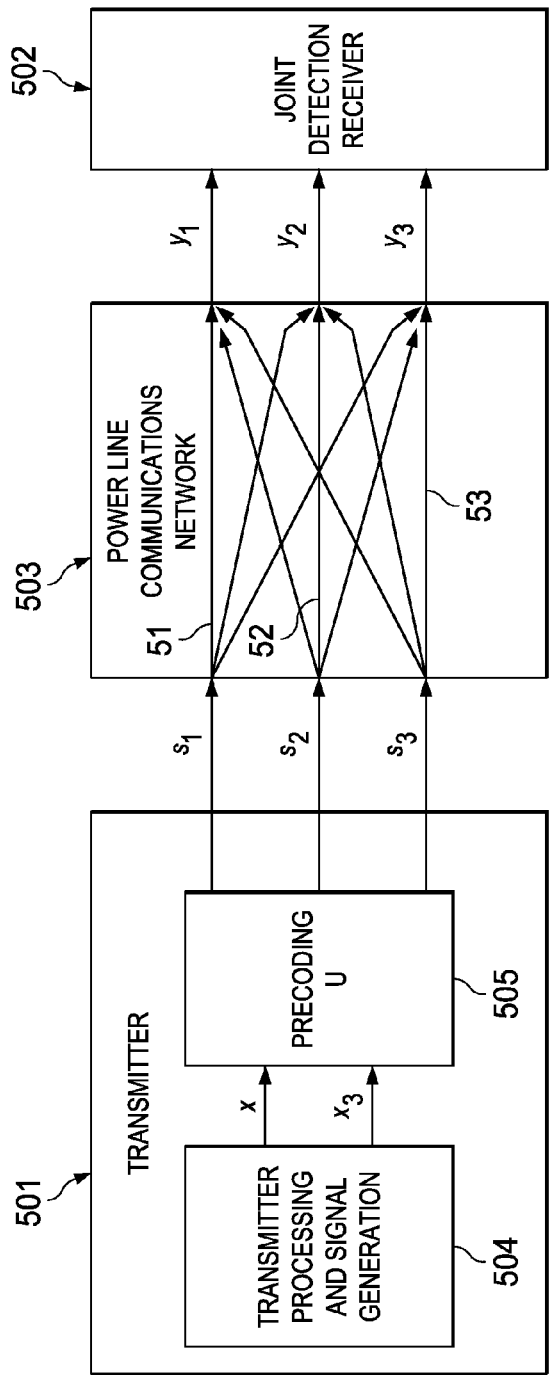
Figure 6:
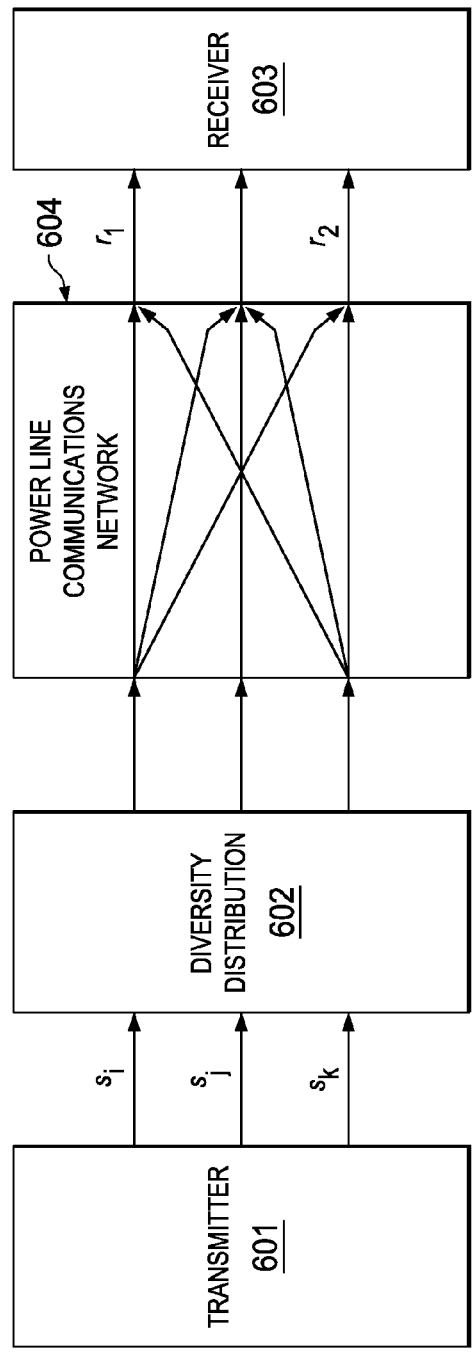
Figure 7:
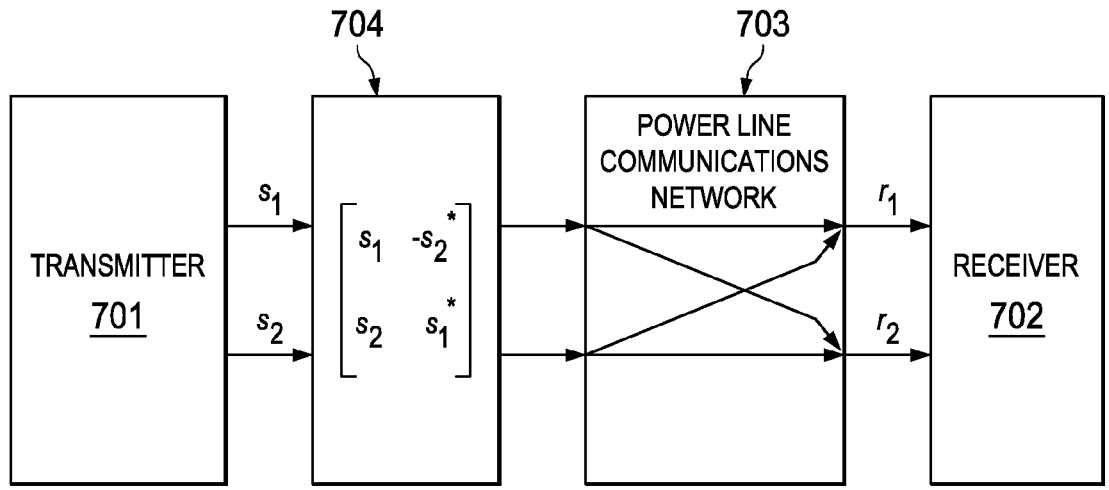
Figure 9:
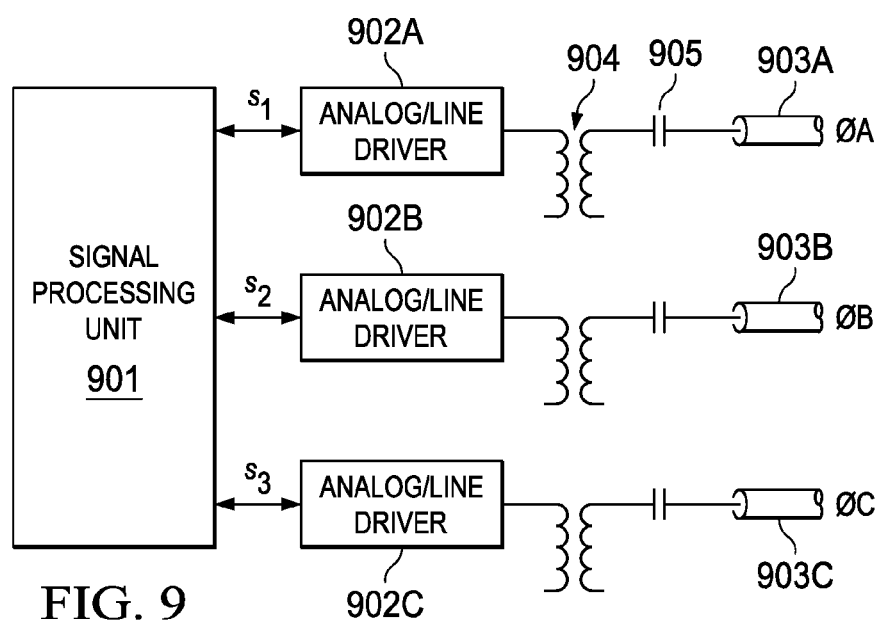
Figure 8:
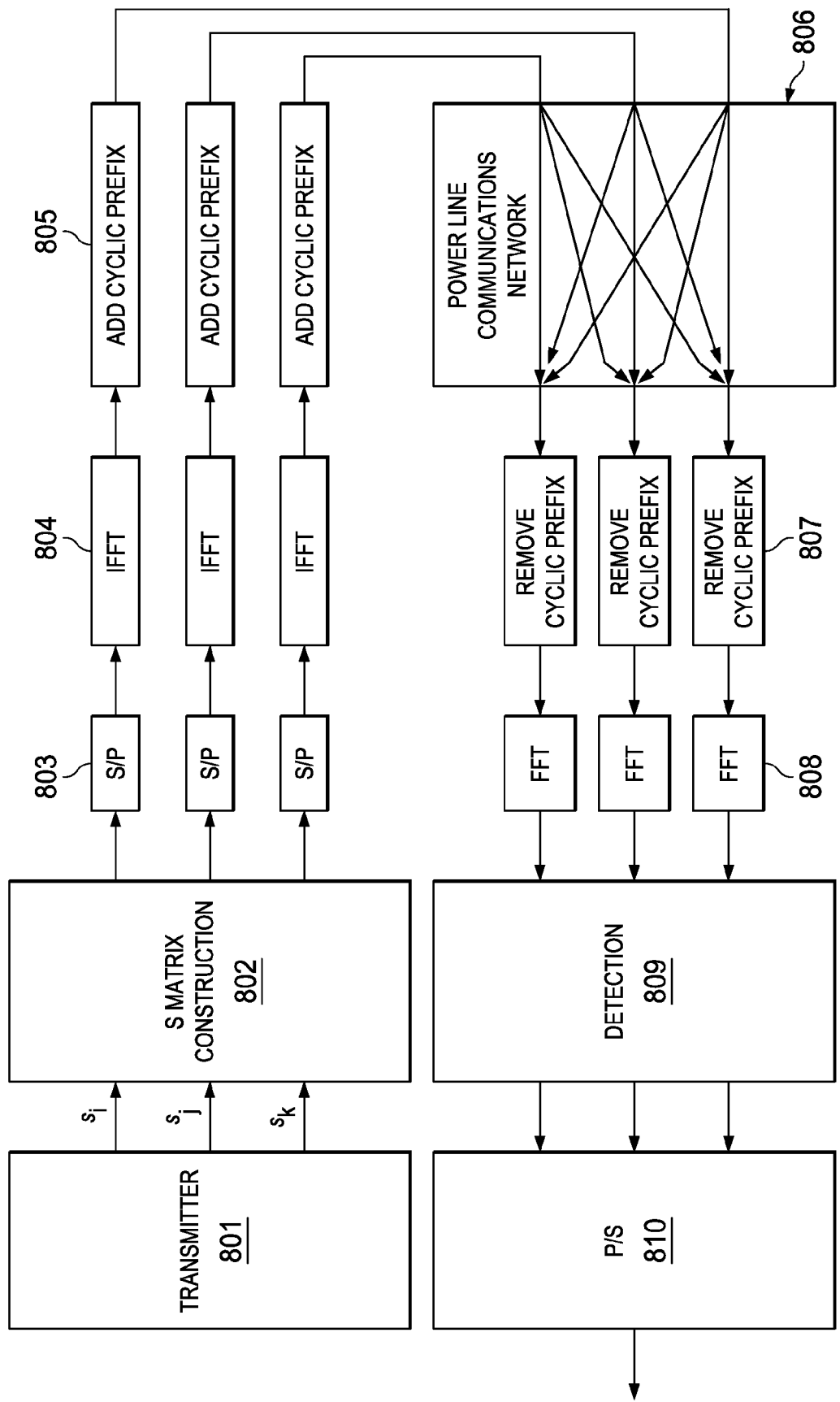
Figure 10:
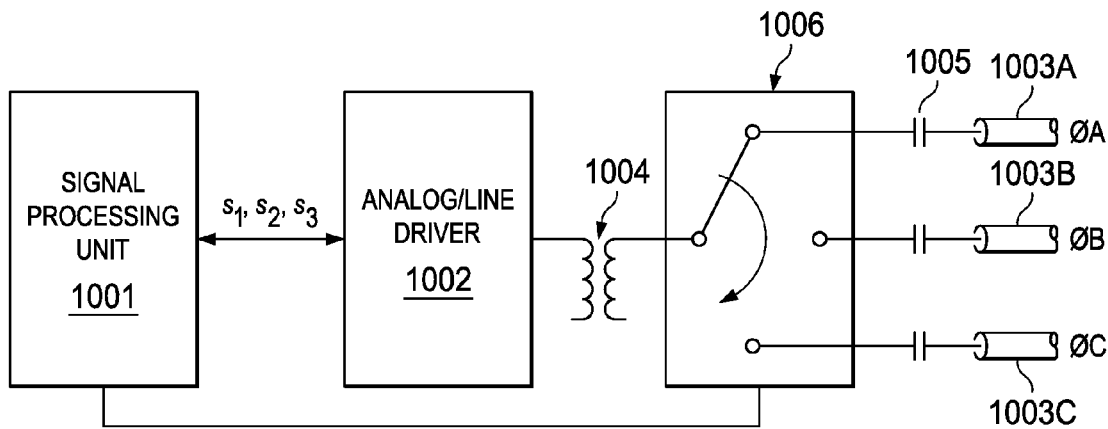
Figure 11:
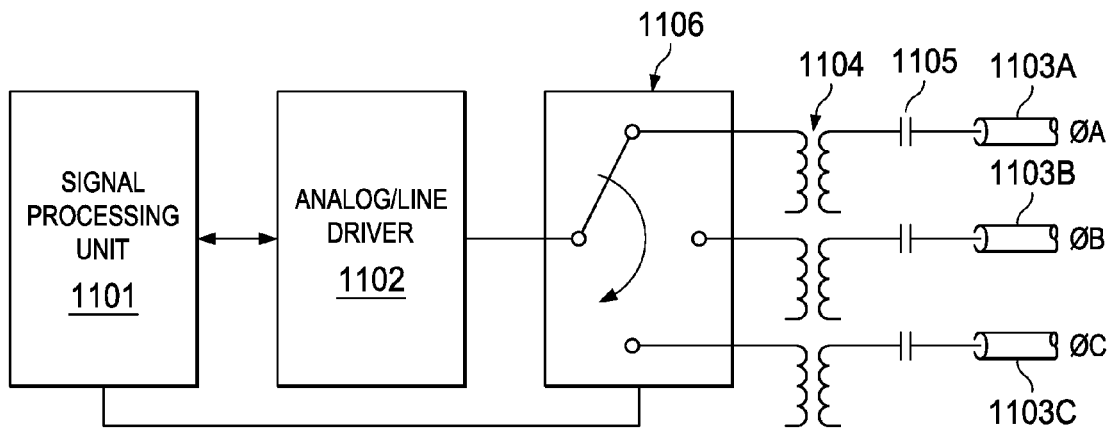
Figure 12:
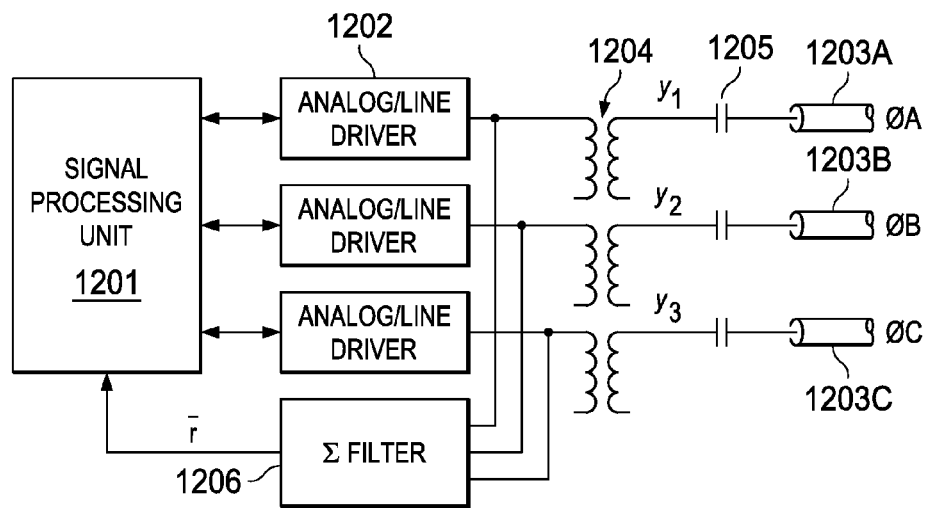

Having thus described the invention in general terms, reference will now be made to the accompanying drawings, wherein:

FIG. 1 illustrates a system for three phase power line communication;

FIG. 2 illustrates signal processing within a system for three phase power line communication;

FIG. 3 illustrates beamforming in a system for three phase power line communication;

FIG. 4 illustrates phase multiplexing in system for three phase power line communication;

FIG. 5 illustrates rank-two transmission phase multiplexing in a system for three phase power line communication;

FIG. 6 illustrates diversity transmission in a power line communication network;

FIG. 7 illustrates an exemplary system for two-phase mode diversity transmission;

FIG. 8 illustrates an exemplary embodiment of an OFDM system implementing three-phase diversity transmission;

FIG. 9 illustrates a connection between transmitter and/or receiver circuitry to the three phase power lines;

FIG. 10 illustrates an alternative connection between transmitter and/or receiver circuitry to the three phase power lines;

FIG. 11 illustrates another alternative connection between transmitter and/or receiver circuitry to the three phase power line;

FIG. 12 illustrates an exemplary three-phase power line network receiver; and

Figure 13:
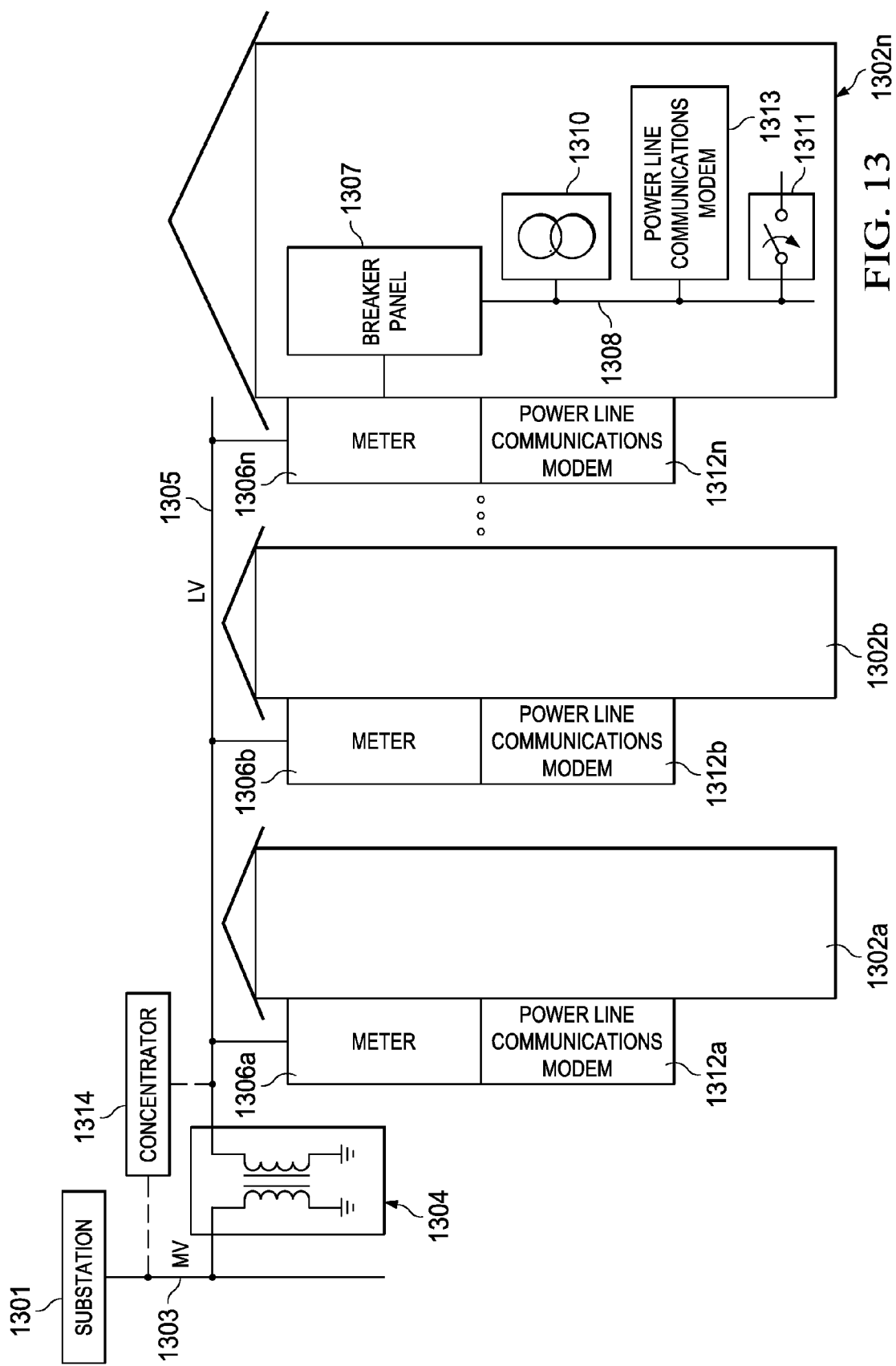

FIG. 13 illustrates a typical electric power distribution system connecting a substation to a residence.

Figure 14:
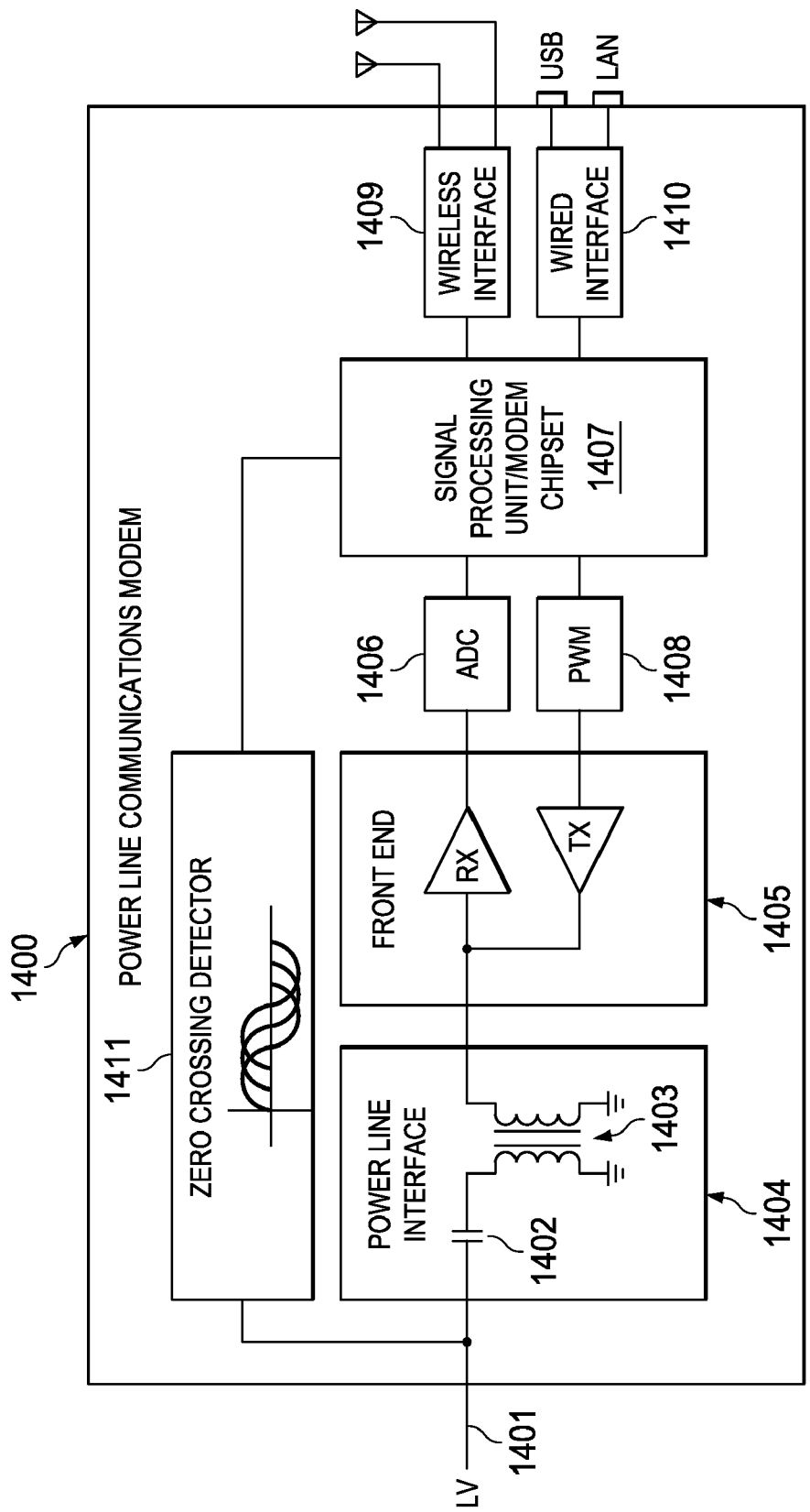

FIG. 14 illustrates a modem for power line communications according to an embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Generally, a power line transmission system comprises a transmitter and receiver connected to one or more phases of a power line network. FIG. 1 illustrates a transmitter 101 and receiver 102 that are connected to three phases 11-13 of power line network 103. Three separate signals $s_1$-$s_3$ are transmitted on different phases 11-13 and each signal may couple and/or interfere with the signals on the other phases. As a result, receiver 102 receives a different combination of the transmitted signals $s_1$-$s_3$ on each phase of 11-13 of power line network 103. Accordingly, each received signal $r_1$-$r_3$ does not directly correspond to the original signal $s_1$-$s_3$ transmitted on the same phase. Such a system can be modeled as a multiple-input, multiple-output (MIMO) channel between transmitter 101 and receiver 102.

FIG. 2 illustrates a power line communication system 200 in which a single signal s is coupled to all available phases 21-23 of power line network 203 by the transmitter 20. Transmitter processing and signal generation block 204 generates datastream s which is coupled to each phase via coupler 205. At receiver 202, the received signals $r_1$-$r_3$ from all of the phases are combined in combiner 206 before receiver processing in block 207. Systems such as the one shown in FIG. 2, do not account for the varying degrees of coupling between phases in actual power line networks. The received signals $r_1$-$r_3$ do not each directly correspond to the original signal $s_1$-$s_3$ transmitted on the same phase. Instead, received signals $r_1$-$r_3$ each correspond to the original signals as modified by inter-phase coupling and interference. The transmission system modifies the transmitted signals based upon the actual state of the power line network 203.

The transmission channel in system 200 may be modeled as $$\bar{r} = \bar{A}\bar{s} + \bar{n} \qquad \text{Eq. 1}$$

where the vectors $\bar{s}=[s_1\ s_2\ s_3]^T$ and $\bar{r}=[r_1\ r_2\ r_3]^T$ represent the transmit and receive signals respectively, and the matrix $$\bar{A} = \begin{bmatrix} a_{11} & a_{12} & a_{13} \\ a_{21} & a_{22} & a_{23} \\ a_{31} & a_{32} & a_{33} \end{bmatrix} \qquad \text{Eq. 2}$$

consists of coupling coefficients $a_{ij}$ between the $j^{th}$ phase on the transmitter and the $i^{th}$ phase of the receiver. Variable $n_i$ is the noise at the $i^{th}$ phase. In the channel model set forth above, intersymbol interference (ISI) is negligible; however, the inventions disclosed herein may also be extended to the power line network transmission cases with ISI between channels.

The channel model shown in Equation 1 can be used to determine various enhancements to power line transmission networks. These enhancements may be categorized according to the number of independent transmit data streams that are multiplexed onto the channel (i.e. onto each of the three separate phases) and to the manner in which these streams are mixed at the transmitter and processed at the receiver.

In one embodiment of the invention—referred to herein as beamforming—a single datastream is transmitted using all three phase of the power line network. Beamforming may be performed either at the transmitter or the receiver. In one embodiment, an appropriate weighting matrix is used at the transmitter and/or receiver to distribute the signal onto the different phases.

FIG. 3 illustrates a communication system 300 with beamforming at both transmitter 301 and receiver 302. Transmit signal processor 304 generates symbol stream {x}. The transmit signal applied to each phase 31-33 is scaled by a corresponding weight $u_i$ in mixers 305. Signal $\bar{s}$, when transmitted across power line network 303, may be represented by:

$$\bar{s} = \begin{bmatrix} u_1 \\ u_2 \\ u_3 \end{bmatrix} x \qquad \text{Eq. 3}$$

The weight vector $\bar{u}=[u_1\ u_2\ u_3]^T$ may be appropriately designed using the coupling information from matrix $\bar{A}$ (shown in Equation 2 above). In an exemplary embodiment, the matrix $\bar{u}$ is chosen to be the dominant left singular vector of $\bar{A}$. Alternatively, matrix $\bar{u}$ is chosen as the closest vector in a pre-determined codebook. Vector $\bar{u}$ may be selected either based on explicit feedback that identifies the preferred $\bar{u}$ vector to be used by the receiver, such as a codebook index value for the $\bar{u}$ vector, or by channel estimates obtained by the transmitter 301 such as by using feedback from the receiver or reciprocity between the transmit and receive channels.

FIG. 3 also illustrates receive beamforming. The received signals $r_1$-$r_3$ are combined in combiner 306 as in prior art systems, such as system 200 in FIG. 2. However, in system 300, a weighted combination is performed by first the received signals $r_1$-$r_3$ in mixers 307 using weight vector $\bar{v}=[v_1\ v_2\ v_3]^T$. The receiver processing at block 308 is performed on the signal:

$$y = [v_1 v_2 v_3]\bar{r} \qquad \text{Eq. 4}$$

In one embodiment, the combination weighting vector $\bar{v}$ is chosen to be the dominant right singular vector of the channel matrix $\bar{A}$.

In other embodiments, the weight vectors $\bar{u}$ and $\bar{v}$ may be selected based on some appropriate performance criteria. For example, in one embodiment, the weight vector $\bar{u}$ can be selected to obtain the maximum received signal-to-noise ration (SNR), wherein the received SNR is given by $$SNR = \frac{\bar{u}^H \bar{A}^H \bar{A} \bar{u} E_S}{E[\bar{n}^H \bar{n}]} \qquad \text{Eq. 5}$$

where $E_S = E|s|^2$. In a related embodiment, the vectors $\bar{u}$ and $\bar{v}$ may also be chosen based upon correlation in the noise levels on the three phases.

For transmit power control, the norm of $\bar{u}$ can be fixed. One possible method to design $\bar{u}$ is that $\bar{u}$ can be selected as the maximum eigenvector associated with the maximum eigenvalue of $\bar{A}^H \bar{A}$. In this case, the exact coupling coefficients must be fed back from receiver 302 to the transmitter 301. Alternatively, the coupling coefficient may be estimated from the "received" signal at the transmitter. In the case where the transmitter-receiver turnaround time is short, the transmitter at one time may act as the receiver at the next time period. Assuming that the coupling coefficients are symmetrical between the transmitter and the receiver, the transmitter may estimate the coupling coefficients using the "received" signals at the transmitter 301 from receiver 302. If quantization vectors are used, then u can be chosen from a vector set $U=\{\bar{u}_1, \bar{u}_2, \ldots, \bar{u}_{2^B}\}$, i.e., $\bar{u} \in U$. In this case, the receiver calculates performance based on $\bar{u}_i$ and sends an index value that optimizes the performance. For example, received SNR for each of $\bar{u}_i$ is $$SNR = \frac{\bar{u}_i^H \bar{A}^H \bar{A} \bar{u}_i E_S}{E[\bar{n}^H \bar{n}]} \quad \text{Eq. 6}$$

and, the receiver sends the index that maximizes the received SNR. In this example, the number of feedback bits is B bits.

In beamforming-based embodiments, a single datastream {x} is sent to the receiver, and the beamforming weights are used to improve the SNR through the powerline network 303. In another embodiment, multiple parallel streams may be sent from transmitter 301 to receiver 302. This would be feasible if coupling coefficient matrix $\bar{A}$ has high rank, implying small correlation or coupling between the signals on the different phases 31-33.

In a further embodiment of the invention—referred to herein as phase mutliplexing—multiple datastreams are transmitted in a manner wherein each of the datastreams are spread across all three phases of the power line network for simultaneous transmission.

FIG. 4 illustrates a system 400 in which three independent symbol streams {$x_1$}, {$x_2$} and {$x_3$} are generated in block 404 and combined by a precoding matrix $\bar{U}$ 405 to obtain the transmit signals $s_1$-$s_3$, which are transmitted by transmitter 401 to receiver 402 on the three phases 41-43 in power line network 403. Receiver 402 detects the effective channel between $\bar{x}$ and $\bar{r}$, given by the product $(\bar{A} \cdot \bar{U})$ of the channel matrix $\bar{A}$ and the precoding matrix $\bar{U}$. Thus, the effective channel in system 400 is modeled as $$\bar{r} = \bar{A}\bar{U} \begin{bmatrix} x_1 \\ x_2 \\ x_3 \end{bmatrix} + \bar{n} \quad \text{Eq. 7}$$

where $\bar{U}$ is 3×3 matrix. The precoding matrix $\bar{U}$ may be selected as described below.

1. Set of {$\bar{U}$}: To maintain constant transmit energy, the norm of $\bar{U}$ may be fixed. In addition, $\bar{U}$ may be constrained to be a unitary matrix. In yet another embodiment, $\bar{U}$ may be quantized to a codebook $U=\{U_1, U_2, \ldots U_{2^B}\}$, i.e., $\bar{U} \in U$.

2. Selection Criteria: Given the set of all possible U, the precoding matrix may be chosen to optimize different performance criteria, such as channel capacity or bit error rate (BER). If all of the coupling coefficients are known, then $\bar{U}$ can be chosen as the right singular matrix of $\bar{A}$.

3. Selection & Signaling Method: The selection of $\bar{U}$ may be done at the transmitter, if the transmitter knows the channel parameters. Alternatively, $\bar{U}$ may be either explicitly or implicitly fed back from the receiver. In one such embodiment, receiver 402 calculates some performance based on each $\bar{U}_i$ and sends the index that optimizes the system's performance. In this case, the number of feedback bits is B bits.

The number of independent symbols transmitted per unit time is denoted as the transmission system's rank. Thus, full three-phase phase-multiplexing as shown in FIG. 4 has rank three, and beamforming as shown in FIG. 3 has rank one.

FIG. 5 illustrates a case of rank-two transmission comprising phase multiplexing in which, at the output of transmitter and signal generation block 504, two of three symbols are the same and one of three symbols is different. For example, $x=x_1, x_2$ are the same, and $x_3$ is different from $x=x_1, x_2$.

When $x=x_1, x_2$ are the same and $x_3$ is different, the received signal can be modeled as $$\bar{r} = \bar{A}\bar{U} \begin{bmatrix} x \\ x_3 \end{bmatrix} + \bar{n} \quad \text{Eq. 8}$$

where $\bar{U}$ is a 3×2 matrix.

The rank of transmission may be fixed or may be adapted depending upon the number of datastreams are going to be transmitted. The system may be adapted using precoding matrix $\bar{U}$ 505 before that is based, for example, upon either receiver feedback or transmitter estimation. After modification in precoding device 505, the signals $s_1$-$s_3$ are transmitted by transmitter 501 to receiver 502 via the three phases 51-53 in power line network 503. Received signals $r_1$-$r_3$ are processed by joint detection receiver 502 to extract original signals $x=x_1, x_2$ and $x_3$.

Another embodiment of the invention provides transmission diversity. The beamforming/phase multiplexing systems shape the transmit signals using a weighting matrix $\bar{U}$. The coupling coefficients used to create the weighting matrix $\bar{U}$ may be either fed back from the receiver or estimated at the transmitter. Transmission diversity provides a way of utilizing a three-phase mode in power line communication systems that does not require knowledge of the coupling coefficients at the transmitter. The transmission diversity systems send a "delayed" copy of the transmitted signals from the current time at a later time interval. The receiver then coherently combines the transmitted signal in a constructive way from each of phases. FIG. 6 shows a general diversity block diagram. Transmitter 601 generates signals $s_1$-$s_3$ from original datastreams {$x_1$}, {$x_2$}, {$x_3$} using, for example, precoding. The precoding matrix may be an identity matrix. Diversity distribution block 602 transmits a first copy of the signals $s_1$-$s_3$ at time T, and a modified version of the signals $s_1$-$s_3$ at time 2T. Diversity receiver 603 receives the signals sent at times T and 2T from power line network 604 and processes them to extract original datastreams {$x_1$}, {$x_2$}, {$x_3$}.

A more detailed example of transmit diversity is described below. FIG. 7 illustrates an exemplary system for two-phase-mode diversity transmission. At a given time, t=T, the signal $\bar{s}_T=[s_1, s_2]^T$ is transmitted at transmitter 701 across two phase power lines in power line network 703 to receiver 702. At the time t=2T, the slightly modified signal $\bar{s}_{2T}=[-s_2^*, s_1^*]^T$ of the original signal $\bar{s}_T$ is transmitted at the transmitter 701 to receiver 702. The transmitted signal in FIG. 7 can be represented by $$\bar{S} = \begin{bmatrix} s_1 & -s_2^* \\ s_2 & s_1^* \end{bmatrix} \quad \text{Eq. 9}$$

where the x-direction of the matrix represents the sampling time and the y-direction represents the phase on which the signal is sent. Assuming two phase reception at the receiver, the received signal at the time t=T from the two phase lines is given by $$\bar{r}_T = \begin{bmatrix} r_{1,T} \\ r_{2,T} \end{bmatrix} = \begin{bmatrix} \alpha_{11} & \alpha_{12} \\ \alpha_{21} & \alpha_{22} \end{bmatrix} \begin{bmatrix} s_1 \\ s_2 \end{bmatrix} + \bar{n}_T, \quad \text{Eq. 10}$$

and the received signal at the time t=2T is given by $$\bar{r}_{2T} = \begin{bmatrix} r^*_{1,2T} \\ r^*_{2,2T} \end{bmatrix} = \begin{bmatrix} \alpha^*_{12} & -\alpha^*_{11} \\ \alpha^*_{22} & -\alpha^*_{21} \end{bmatrix} \begin{bmatrix} s_1 \\ s_2 \end{bmatrix} + \bar{n}_{2T}. \quad \text{Eq. 11}$$

Equation 11 assumes that the coupling coefficients are not frequently changing for the 2T time frame. The channel model set forth above assumes no ISI, but it is also applicable to the ISI case by removing intersymbol interference using, for example, OFDM transmission.

With appropriate modification of the signals received for the time frames T and 2T, the received signal is represented by the following equation:

$$\bar{r} = \begin{bmatrix} r_{1,T} \\ r^*_{1,2T} \\ r_{2,T} \\ r^*_{2,2T} \end{bmatrix} \begin{bmatrix} \alpha_{11} & \alpha_{12} \\ \alpha^*_{12} & -\alpha^*_{11} \\ \alpha_{21} & \alpha_{22} \\ \alpha^*_{22} & -\alpha^*_{21} \end{bmatrix} \begin{bmatrix} s_1 \\ s_2 \end{bmatrix} + \bar{n} = \bar{A}_{4 \times 2} \bar{s} + \bar{n}. \quad \text{Eq. 12}$$

With multiplication by $\bar{A}_{4\times 2}^H$, the following equation is derived:

$$\tilde{r} = \bar{A}_{4\times 2}^H \bar{r} = (|\alpha_{11}|^2 + |\alpha_{12}|^2 + |\alpha_{21}|^2 + |\alpha_{22}|^2) \begin{bmatrix} s_1 \\ s_2 \end{bmatrix} + \tilde{n} \quad \text{Eq. 13}$$

With this modified to the received signal, the receiver performs decoding. As can be seen above, for decoding, it is essential to estimate the coupling coefficients $\alpha_{ij}$ at the receiver. The advantage of this method is that even though one of the paths has bad signal quality, the signal on that path can be recovered from the other paths. Therefore, the independent coupling information can be used to send the signals without having coupling information at the transmitter. As shown in FIG. 7, the square matrix $\bar{S}$ of Equation 9 can be used to modify the signals in block 704 before transmission on power line network 703 to receiver 702.

For three-phase mode transmission, the square matrix $\bar{S}$ is more difficult to generate. One embodiment of a matrix for the three phase diversity transmission mode is $$\bar{S} = \begin{bmatrix} s_1 & -s_2 & -s_3 & -s_4 & s_1^* & -s_2^* & -s_3^* & -s_4^* \\ s_2 & s_1 & s_4 & -s_3 & s_2^* & s_1^* & s_4^* & -s_3^* \\ s_3 & s_4 & s_1 & s_2 & s_3^* & s_4^* & s_1^* & s_2^* \end{bmatrix}, \quad \text{Eq. 14}$$

wherein at time t=T, the transmitter sends $\bar{S}_T = [s_1, s_2, s_3]^T$ and at the time t=2T, the transmitter sends $\bar{S}_{2T} = [-s_2, s_1, s_4]^T$, and so on. Signals $s_1$, $s_2$, $s_3$, and $s_4$ are independent signals. Those of ordinary skill in the art will understand that other constructions are also possible.

An exemplary embodiment of an OFDM system implementing three-phase diversity transmission is shown in FIG. 8. Transmitter 801 generates signals $s_i$, $s_j$, $s_k$ from original datastreams $\{x_1\}$, $\{x_2\}$, $\{x_3\}$ using, for example, precoding. S-Matrix construction block 802 generates the $\bar{S}$ matrix from signals $s_i$, $s_j$, $s_k$ and transmits the appropriate signals at time T and 2T. The signals subject to OFDM transmit processing, such as serial-to-parallel conversion (S/P) in block 803, inverse fast Fourier transform (IFFT) processing in block 804, and cyclic prefix (CP) addition in block 805. The signals are then transmitted on the appropriate phase of power line network 806. The received signals undergo further OFDM processing, such as removing the cyclic prefix in block 807, fast Fourier transform (FFT) processing in block 808, OFDM decoding, such as deinterleaving and Viterbi decoding, in block 809, and parallel to serial (P/S) conversion in block 810. Diversity receiver components 807-810 receive the signals sent at times T and 2T and process them to extract original datastreams $\{x_1\}$, $\{x_2\}$, $\{x_3\}$.

One of ordinary skill in the art will understand that the components of the power line communications systems described herein may be embodied as individual circuits or separate components, or as a single device that performs more than one of the illustrated operations. For example, in one embodiment, the transmitters and receivers described herein may be embodied as a microprocessor, central processing unit (CPU), integrated circuit (I/C), or application specific integrated circuit (ASIC). Software, firmware, or other embedded instructions may control the operation of the transmitter and receivers and cause the component to perform the functions described herein. Such devices may further perform the transmitter processing and signal generation, precoding, receiver processing and signal generation, power line coupling, signal combining, diversity distribution, S-Matrix construction, S/P and P/S conversion, IFFT and FFT processing, CP addition and removal, OFDM decoding, and detection.

FIG. 9 illustrates the connection between the transmitter and/or receiver circuitry to the power lines according to one embodiment of the invention. Signal processing unit (SPU) 901 may function as the transmitter circuit in the embodiments described above. SPU 901 generates three precoded signals $s_1$-$s_3$ for transmission over the power line network. Each output signal $s_1$-$s_3$, which may be a digital signal, is provided to a separate analog circuit/line driver 902A-C. Analog circuits/line drivers 902 comprise, for example, digital-to-analog conversion circuitry, filters and line drivers that couple signals from SPU 901 to power lines 903A-C. A transformer 904 and coupling capacitor 905 link each analog circuit/line driver 902 to its respective power line 903. Accordingly, in the embodiment illustrated in FIG. 9, each output signal is independently linked to a separate, dedicated power line.

FIG. 10 illustrates an alternative embodiment in which SPU 1001 is coupled to a single analog circuit/line driver 1002, which is in turn coupled to power lines 1003A-C by a single transformer 1004. All of the output signals are sent through analog circuit/line driver 1002 and transformer 1004. Switch 1006 selects which power line 1003A-C receives a particular signal $s_1$-$s_3$. Switch 1006 may be controlled by SPU 1001. Alternatively, switch 1006 may determine which power line 1003A-C should receive a particular signal $s_1$-$s_3$ based upon information, such as a header or other data, in the signal $s_1$-$s_3$. Switch 1006 links analog circuit/line driver 1002 and transformer 1004 to the selected power line 1003A-C and associated coupling capacitor 1005.

FIG. 11 is similar to FIG. 10 in which SPU 1101 is coupled to a single analog circuit/line driver 1102. However, in the embodiment of FIG. 11, power lines 1103A-C are each coupled to a separate transformer 1104 and coupling capacitor 1105. Analog circuit/line driver 1102 is coupled to the transformers 1104 for each power line 1103 via switch 1106. Switch 1106 selects which transformer 1104, coupling capacitor 1105, and power line 1103A-C receives a particular signal $s_1$-$s_3$. Switch 1106 may be controlled by SPU 1101, or switch 1106 may determine which power line 1103A-C should receive a particular signal $s_1$-$s_3$ based upon information, such as a header or other data, in each signal $s_1$-$s_3$.

FIG. 12 illustrates a receiver according to exemplary embodiments. Signals $y_1$-$y_3$ are received on power lines 1203A-C, respectively. In one embodiment, each of the received signals may based individually through coupling capacitors 1205, transformer 1204, and analog circuit/line driver 1202 to SPU 1201 for detection and receiver processing of each signal separately. Alternatively, for the beamforming case or for a rank one transmission system, where a single datastream is spread across all three phases, the received signals $y_1$-$y_3$ may be routed to summing filter 1206, which combines all of the received signals into one signal $\bar{r}$ that is routed to SPU 1201 for receiver processing.

Referring again to FIG. 13, the scaling or weighting of data signals as disclosed herein may be used by concentrator 1314 and modems 1312a-n, 1313 to exchange the data signals across different phases of the power line network. MV lines 1303 and LV lines 1305 may be three phase electrical power lines. Accordingly, concentrator 1314 may distribute a single data signal over one or more of the phases or may spread multiple data signals over a plurality of the phases. Modems 1312a-n, 1313 receive and decode the data signals from concentrator 1314, and may also transmit signals to concentrator 1314. In one embodiment, concentrator 1314 spreads data signals across two or more phases on the MV or LV power lines 1303, 1305 and modems 1312a-n, 1313 receive the signals on a single phase.

FIG. 14 illustrates modem 1400 for power line communications according to one embodiment. Modem 1400 is coupled to LV power lines 1401, either directly or through an electrical meter, via coupling capacitor 1402 and transformer 1403 in power line interface 1404. Modem front end 1405 comprises transmit and receive amplifiers, filters and other interface circuitry. Modulated signals enter the receiver stage of front end 1405 and are converted to digital form in analog-to-digital converter (ADC) 1406 and then processed in modem chipset 1407. Modem chipset 1407, which may be a microprocessor, microcontroller, Application Specific Integrated Circuit (ASIC), or other integrated circuit, controls the operation of modem 1400 and process the transmit and receive signals as the signal processing unit (SPU) described herein. When chipset 1407 generates signals for transmission, the digital signals are modulated in pulse width modulator (PWM) 1408 and then sent to front end 1405 for transmission over the power lines 1401. Modem 1400 may provide an interface to external devices, such as computers, telephones, or televisions, via wireless interface 1409 or wired interface 1410. Chipset 1407 controls the exchange of data signals through modem 1400 between the external devices and the power lines.

Modem 1400 may also comprise zero crossing detector (ZCD) 1411 that is coupled to power lines 1401. In one embodiment, ZCD 1411 detects the phase of received signals, such as the times at which the received AC signal crosses zero voltage, ZCD 1411 identifies the phase of power line 1401 and provides phase information to chipset 1407. In one embodiment, modem chipset 1407 generates data signals comprising the phase information and sends those signals to a remote transmitter, such as concentrator 1314 (FIG. 13). These signals identify for the transmitter or concentrator the phase on which modem 1400 is most likely receiving signals.

The concentrator may use this information to determine how to distribute signals that are sent across power lines 1401. For example, if the zero-crossing/phase information sent by modem 1400 identifies phase 1 as the phase to which modem 1400 is connected, then the concentrator sends data signals to modem 1400 only on phase 1. Alternatively, the concentrator may send data signals to modem 1400 on each phase, but could first scale or weight the data signals to optimize reception of the signals by modem 1400 on phase 1. This phase-identification information may also be used to control how the concentrator selects which phase receives a particular data signal. For example, if the concentrator uses the power line coupling circuit illustrated in FIG. 10, the phase information for modem 1400 can be used to control switch 1006, which selects phase of the power line receives a particular signal.

In another embodiment, the concentrator may receive phase information from a plurality of modems. For example, modems 1312a-n (FIG. 13) at a plurality of residences 1302a-n may use zero crossing detection information to identify which phase is coupled to each modem 1312a-n. Concentrator 1314 can then use this phase information to send data to the users at each residence. The concentrator 1314 may know from zero-crossing or phase reports sent by the modems that modem 1312a for user A is on phase 1, modem 1312b for user B is on phase 2, and modem 1312n for user N is on phase 3. The concentrator 1314 may then transmit to each user simultaneously by selecting phase 1 for user A, phase 2 for user B, and phase 3 for user N. The data signals for each user may be weighted or scaled to be optimized for that user's modem's phase. For example, the weight vector used to scale a symbol stream sent to a particular user may be adapted to optimize the symbol stream for transmission or reception on a selected phase.

Additionally, if concentrator 1314 knows that another user C (not shown) is also on phase 1, then the concentrator ensures that it does not transmit data signals to A and C simultaneously on phase 1. The concentrator can use the ZCD information that is fed back from users A, B, C, and N to employ precoding specific to each user's phase. In this way, the system may provide multi-user coding.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for transmitting data on a power line network, comprising:
   receiving a user phase identification from a receiver;
   generating at least one symbol stream to be transmitted on the power line network to the receiver;
   scaling the at least one symbol stream using a weight vector to generate a plurality of scaled symbol streams, the weight vector comprising a plurality of weights corresponding to phases of the power line network, the scaling optimizing the symbol stream for transmission over the user phase; and
   transmitting each of the scaled symbol streams on a corresponding phase of the power line network.

2. The method of claim 1, wherein two or more of the at least one symbol streams are the same.

3. The method of claim 1, further comprising:
at a first time, transmitting a first scaled symbol stream on a first phase and a second scaled symbol stream on a second phase; and
at a second time, transmitting a negative conjugate transpose of the second scaled symbol stream on the first phase and a conjugate transpose of the first scaled symbol stream on the second phase.

4. The method of claim 3, further comprising:
receiving the symbol streams transmitted at the first and second times;
combining the symbol streams in a receiver to create a modified received signal; and
decoding the modified received signal.

5. The method of claim 1, further comprising:
receiving each of the scaled symbol streams on a corresponding phase of the power line network;
applying a received signal weight to each of the received scaled symbol streams; and
combining the weighted received scaled symbol streams.

6. The method of claim 1, further comprising:
generating a power line coupling matrix comprising coupling coefficients between each phase of a transmitting end of the power line network and each phase of a receiving end of the power line network; and
wherein the weight vector is selected based upon data in the power line coupling matrix.

7. The method of claim 6, wherein a transmitter generates the power line coupling matrix based upon feedback from a receiver that is coupled to the transmitter by the power line network.

8. The method of claim 6, wherein a transmitter generates the power line coupling matrix based upon signals sent from a receiver that is coupled to the transmitter by the power line network.

9. The method of claim 1, wherein the weight vector is selected from a pre-determined codebook.

10. The method of claim 9, wherein a transmitter selects the weight vector from the pre-determined codebook based upon a codebook index identified by a receiver.

11. The method of claim 1, wherein the user phase identification is determined by a zero crossing detector in the receiver.

12. The method of claim 1, wherein weight vector is selected to optimize performance criteria on the power line network, and the performance criteria comprise at least one of a signal-to-noise ratio (SNR), bit error rate (BER) or power line network channel capacity.

13. The method of claim 1, further comprising:
coupling each of the scaled symbol streams to a line driver, transformer and coupling capacitor dedicated to the corresponding phase of the power line network.

14. The method of claim 1, further comprising:
coupling each of the scaled symbol streams to a line driver and a transformer; and
switching each of the scaled symbol streams from the transformer to a coupling capacitor dedicated to the corresponding phase of the power line network.

15. The method of claim 1, further comprising:
coupling each of the scaled symbol streams to a line driver; and
switching each of the scaled symbol streams from the line driver to a transformer and a coupling capacitor dedicated to the corresponding phase of the power line network.

16. A transmitter, comprising:
a signal generation circuit creating one or more data streams; and
a precoding circuit scaling the one or more data streams with a weight vector to create a plurality of scaled data streams, each of the scaled data streams adapted for transmission to a receiver on a particular phase of mains cycle, and coupling each of the scaled data streams to a designated phase of a power line network.

17. The transmitter of claim 16, wherein the signal generation circuit identifies phases associated with a plurality of receivers, and the signal generation circuit creates only one data stream at a time for each phase.

18. The transmitter of claim 16, further comprising:
a diversity distribution circuit coupled to the precoding circuit, the diversity distribution circuit transmitting, at a first time, a first scaled data stream to a first phase of a power line network and a second scaled data stream to a second phase of a power line network; and transmitting, at a second time, a modified version of the second scaled data stream on the first phase and a modified version of the first scaled data stream on the second phase, wherein the modified versions of the first scaled data stream and the second scaled data stream comprise the conjugate transposes of the first scaled data stream and the second scaled data stream.

19. The transmitter of claim 16, wherein at least two of the one or more symbol streams to be transmitted are the same.

20. The transmitter of claim 16, wherein the weight vector is selected from a pre-determined codebook.

21. The transmitter of claim 16, further comprising:
separate line drivers receiving each of the plurality of scaled data streams from the precoding circuit;
separate transformers receiving a scaled data stream from a corresponding line driver; and
separate coupling capacitors linking each transformer to one of the phases of the power line network.

22. The transmitter of claim 16, further comprising:
a line driver receiving each of the plurality of scaled data streams from the precoding circuit;
a transformer receiving each of the plurality of scaled data streams from the line driver;
a switch adapted to switchably connect the transformer to a plurality of coupling capacitors, each of the coupling capacitors linked to one of the phases of the power line network.

23. The transmitter of claim 16, further comprising:
a line driver receiving each of the plurality of scaled data streams from the precoding circuit;
a switch adapted to switchably connect the line driver to a plurality of transformers, each of the transformers coupled to a phases of the power line network by a coupling capacitor.

24. A receiver coupled to a power line, comprising:
a zero crossing detector that is adapted to identify a phase associated with the power line;
a processor adapted to send phase signals on the power line to a remote transmitter, the phase signals comprising information from the zero crossing detector;
a coupler receiving data streams from the power line network;
a scaling circuit receiving the data streams from the coupler, the scaling circuit applying a signal weight to the received data streams to create weighted data streams; and
a decoding circuit receiving the combined weighted data streams.

25. The receiver of claim 24, further comprising:
a combiner receiving the weighted data streams from the scaling circuit and combining the weighted data streams before sending the combined data streams to the decoding circuit.

26. The receiver of claim 24, wherein the decoding circuit receives the a first group of data streams at a first time and receives a second group of data streams at a second time, the decoding circuit combining the first and second groups of data streams to create a modified received signal prior to decoding the modified received signal.

* * * * *